Feb. 24, 1942.  H. W. WEIMER  2,274,512
MOTION TRANSMITTING MECHANISM
Filed July 5, 1941
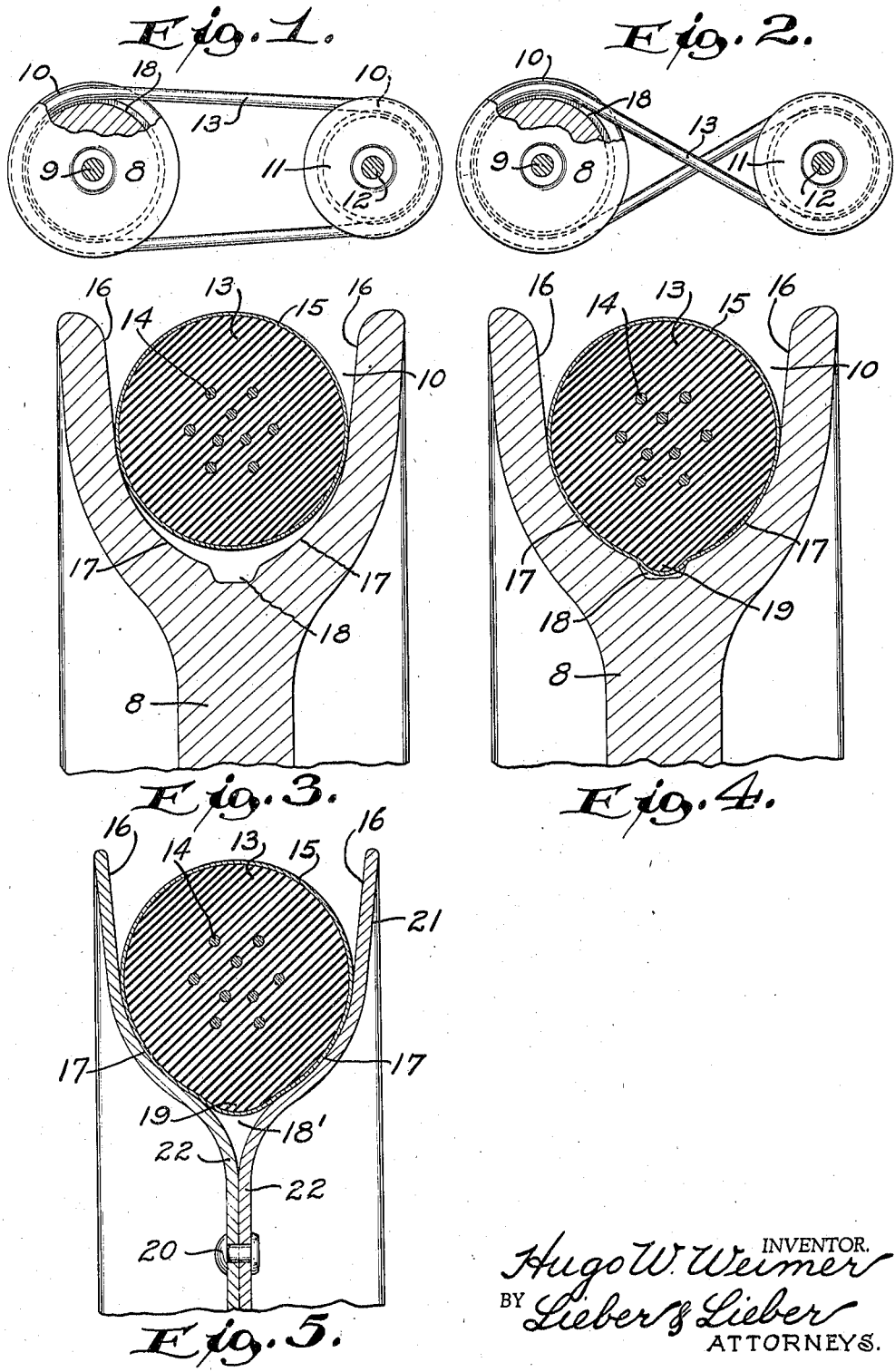
INVENTOR.
Hugo W. Weimer
BY Lieber & Lieber
ATTORNEYS.

Patented Feb. 24, 1942

2,274,512

UNITED STATES PATENT OFFICE 2,274,512

MOTION TRANSMITTING MECHANISM

Hugo W. Weimer, Milwaukee, Wis.

Application July 5, 1941, Serial No. 401,109

6 Claims. (Cl. 74—230.5)

My invention relates generally to improvements in the art of transmitting rotary motion from one shaft to another, and relates more particularly to improvements in the construction and operation of flexible belt drives for transferring rotary motion from a driving to a driven sheave either in the same or reverse direction.

An object of my present invention is to provide an improved rotary motion transmitting assemblage which is simple in construction and efficient in operation.

It has heretofore been proposed to utilize power transmitting mechanism comprising one or more elastic V-belts coacting with the grooves of peripherally separated driving and driven sheaves, for diverse purposes; and while these prior rubber V-belt drives have proven relatively satisfactory especially for close center driving, they cannot be readily utilized either with the belts crossed for the purpose of rotating the driven shaft or sheave reversely of the direction of rotation of the driving shaft or sheave, or in very small sizes, because of the trapezoidal cross-section of the belts. The elasticity of the rubber belts is advantageous especially in multiple belt drives, since it permits automatic equalization of the pull or tension on the several belts; but the wedge shape of the transverse cross-section of the belts, and the corresponding wedge or V-shape of the grooves with which the belts coact, causes considerable loss of power and some whipping of the belts, due to the excessive friction resulting from repeatedly forcing the V-shaped belts into the grooves and withdrawing the belts therefrom. This friction loss can be reduced by increasing the included angle between the contacting side surfaces of belt and groove, but such increase of the included angle beyond a certain maximum, also results in loss of power due to excessive slippage.

I have discovered, that by properly forming the sheave groove so as to insure desirable wedging action, and by utilizing an internally reenforced elastic belt of rubber or the like, but having approximately circular transverse cross section, the belt or belts can not only be operated in either crossed or uncrossed fashion so as to secure rotation of the driven member in either reverse or the same direction as that of the driver, but excessive wedging action and consequent friction losses may be minimized. The circular sectioned elastic belts are also free to roll in the sheave grooves and to thus distribute the wear thereon, thereby prolonging the life thereof; and the circular or round belts may also be more readily constructed in extremely small sizes with simple molds and other equipment.

It is therefore a more specific object of my present invention to provide an improved motion transmitting mechanism utilizing one or more approximately round sectioned elastic belts, and grooved sheaves the grooves of which are formed to most effectively cooperate with these round belts.

Another specific object of the present invention is to provide an improved single or multiple belt drive having rubber or similar elastic belts which may be produced in small sizes and caused to effectively coact with cooperating sheave grooves, for either direct or reverse transmission of rotary motion, and with the sheaves located closely adjacent to each other.

A further specific object of my invention is to provide an improved round sectioned rubber belt, and an improved sheave structure adapted to most efficiently coact with the belt in any selected manner.

Still another specific object of this invention is to provide an improved belt drive which can be manufactured and sold at moderate cost, and which is adapted for diverse uses and for small or large sizes.

These and other specific objects and advantages will be apparent from the following detailed description.

A clear conception of the several features constituting the present improvement, and of the mode of constructing and of utilizing belt drives embodying the invention, may be had by referring to the drawing accompanying and forming a part of the present specification in which like reference characters designate the same or similar parts in the various views.

Fig. 1 is a somewhat diagrammatic and part sectional side elevation of a typical round elastic belt drive, with the belt applied to produce like rotation of the driving and driven sheaves;

Fig. 2 is a similar view of a similar drive, but with the belt applied to produce reverse or opposite rotation of the driving and driven sheaves;

Fig. 3 is a considerably enlarged transverse cross-section through one of the improved belts and the peripheral portion of a single groove sheave of cast metal, showing the belt before it assumes actual driving contact with the groove;

Fig. 4 is an enlarged cross-section similar to that of Fig. 3, but showing the belt in driving coaction with the sheave groove; and Fig. 5 is a similarly enlarged cross-sectional view through a belt and peripheral portion of a single groove sheet metal sheave, also showing the belt in driving contact with the sheave groove.

While the invention has been shown and described herein as being embodied in a single rope close center drive and with the belt formed of rubber and reenforced and protected in a particular manner, it is not my desire or intent to thereby unnecessarily limit the scope or utility of the invention which is also advantageously applicable to multiple belt drives for either direct or reverse rotary motion transmission.

Referring to the drawing, the typical belt drive embodying my invention comprises in general a driving sheave 8 mounted upon a driving shaft 9 and having an annular peripheral groove 10; a driven sheave 11 mounted upon a driven shaft 12 and having a similarly shaped annular peripheral groove 10; and an endless flexible approximately circular sectioned belt 13 adapted to coact with the approximately alined grooves 10 of the sheaves 8, 11. The central axes of the shafts 9, 12 are ordinarily disposed substantially parallel to each other; and the driving shaft 9 may be rotated either continuously or intermittently at any desired speed, and from any suitable source of power, so that the driven shaft 12 will be similarly rotated at a predetermined speed which may be equal to greater or less than that of the driving shaft 9, dependent upon the relative sizes or diameters of the sheaves 8, 11. The cooperating sheaves 8, 11 may have any desired diameter, and the peripheral portions of these sheaves may be spaced apart predetermined distances, in order to meet various conditions of operation of the mechanism.

In accordance with the present improvement, the endless belts 13 preferably have approximately circular or round transverse cross-section, and are formed mainly of rubber or rubber composition in order to provide the desired flexibility and elasticity. In producing belts 13 of smaller sizes, one or more strong cords 14 may be embedded in the central portion of each belt 13 to provide a pull or tension resisting longitudinal core; and the peripheries of these belts 13 may also be covered and protected by means of one or more layers of fabric 15. The cords 14 and fabric covering 15 are preferably impregnated with the rubber and are vulcanized to the body of the belt. In some cases it may be desirable to embed one or more additional fabric layers in the body of the belt, but in belts of exceptionally small diameter it is preferable to utilize only one or several cords 14 and to entirely omit the fabric. While the belts 13 are preferably endless, they may also be spliced to permit convenient application thereof to the sheaves, and this splicing may be effected by any of the well known methods, and the term endless as used herein is also intended to apply to a spliced endless belt structure.

The grooves 10 of the sheaves 8, 11 are of special formation as shown in detail in Figs. 3 and 4, and these grooves should be accurately machined with the aid of templates so as to properly coact with the round belts 13. Approximately the upper or outer half of each groove 10 is bounded by tapered side surfaces 16 the lower or inner edges of which are spaced apart a distance approximately equal to the diameter of the belt 13. The lower or inner portion of each groove 10 is provided with opposite curved and gradually approaching side surfaces 17 of greater curvature than the belt periphery, and the bottom of the groove has an annular recess 18 therein. This special groove formation is such that when the belt 13 is placed under pull or tension, it will be drawn inwardly of the sheaves 8, 11, from the position shown in Fig. 3 to that shown in Fig. 4, and the cross-section of the coacting portion of the belt 13 will be slightly deformed by the distorting action of the approaching side curved surfaces 17. This deformation will cause the lowermost portion of the belt 13 to distort into the form of a bead 19 which enters and wedges into the recess 18, and will also cause the opposite side portions of the belt to ride slightly above the center of the groove 10 and in contact with the inner edge portions of the side surfaces 16. The greater the longitudinal pull on the belt, the more pronounced will be the distortion thereof and hence the driving contact; and when the tension is released, the elastic belt 13 will quickly reassume its normal cross-section and a position farther away from the sheave axis due to the curvature of the groove surfaces 17.

While the sheaves 8, 11 may be formed of cast metal and of one piece as shown in Figs. 3 and 4, they may also be produced of sheet metal with the aid of punches and dies, as shown in Fig. 5. The sheet metal sheave 21 is formed of two identical halves or sections 22 which may be rigidly united by welding or with the aid of rivets 20, and the grooves 10 of these modified sheet metal sheaves are of substantially the same special shape as hereinabove specifically described except that in the stamped sheave 21 the recess 18' may be formed as shown.

During normal use of the improved motion transmitting mechanism, the round section elastic belt or belts 13 may either be applied to the properly grooved and positioned driving and driven sheaves 8, 11, as shown in Fig. 1 or as illustrated in Fig. 2. When applied as in Fig. 1, the driving sheave 8 may be rotated in either direction and the driven sheave 11 will be rotated in a direction corresponding to that of the driving sheave; but when the belt or belts 13 are crossed as in Fig. 2, the driving sheave 8 may be rotated in either direction while the driven sheave 11 will always be rotated in the opposite direction. During such rotation of the driving sheave 8 in either case, the belt 13 will be automatically pulled into driving wedge contact with the side surfaces 16, 17 of the grooves 10 and deformed when power is being transmitted, and the belt 13 will automatically assume normal round cross-section when it leaves the grooves 10 or when the tension is released.

From the foregoing detailed description it will be apparent that the present invention provides an improved belt drive adapted to be utilized either singly or in multiple, and wherein an elastic circular section belt is caused to effectively drivingly engage a properly formed sheave groove. By virtue of the fact that the belt is of circular cross-section, this belt can roll in the grooves 10 and assume any position therein, thus effectively distributing the wear on the belt. The circular belt can also be constructed in extremely small sizes, that is of small diameter, as compared to the prior elastic V-belts, and the use of rubber or similar elastic material, in the formation of these belts is extremely desirable in order to permit ready deformation of the cross-section and restoration to normal cross-section. The construction of the grooves 10 is also such that minimum friction loss results during wedging of the belts within the grooves, without permitting undesirable slippage, and this groove construction is moreover such that it will tend to quickly release the belt from driving coaction with the groove bottom. The improved power transmitting mechanism can obviously be applied for diverse purposes, and is equally as effective when the belts are crossed as in Fig. 2, as when the belts are uncrossed as in Fig. 1. The sheave structures can be produced in any desired manner, either by casting or with the aid of punches and dies, and the improved belt structures can also be produced with relatively simple molds and other equipment.

It should be understood that it is not desired to limit this invention to the exact details of construction or to the precise mode of use, herein shown and described, for various modifications within the scope of the claims may occur to persons skilled in the art.

I claim:

1. In combination, driving and driven sheaves having approximately alined peripheral grooves, and an elastic approximately round endless belt coacting with said grooves, each groove having a recess near the bottom thereof and curved opposite side surfaces diverging away from said recess and adapted to deform the inner portion of said elastic belt into said recess while constantly urging the major portion of the elastic belt body outwardly away from the sheave axis.

2. In combination, driving and driven sheaves rotatable about substantially parallel axes and having approximately alined peripheral grooves, and an elastic approximately round endless belt coacting with said grooves, each groove having an annular recess at the bottom and curved opposite side surfaces diverging outwardly away from the opposite sides of said recess with gradually decreasing curvature and adapted to deform the inner portion of said elastic belt into said recess with a wedging action while constantly urging the major portion of the elastic belt body away from said axes.

3. In combination, a pair of sheaves rotatable about substantially parallel axes and having approximately alined peripheral grooves, and an internally reenforced rubber approximately round endless belt coacting with said grooves, each groove having curved opposite inwardly directed surfaces converging toward a bottom recess and formed to deform said elastic belt into said recess when the belt is placed under tension while constantly tending to urge the major portion of the belt body away from said axes.

4. In combination, a sheave rotatable about an axis and having a peripheral groove, a round elastic endless belt cooperable with said groove, said groove having curved opposite side surfaces converging inwardly toward a narrow bottom recess and formed to deform said elastic belt into said recess when tension is applied while constantly tending to urge the elastic belt away from the sheave axis, and means cooperable with said belt to thus apply tension thereto.

5. In combination, a rotary sheave having one annular peripheral groove of relatively narrow width and small diameter disposed within another wider annular peripheral groove of larger diameter, and an endless elastic rubber belt of approximately circular cross-section adapted to be deformed within the inner portion of said wider groove and to be wedged into the space provided by said narrower groove, the inner portions of the side surfaces of said wider grooves being curved inwardly toward the outer opposite side portions of said narrow groove and the outer portions of said surfaces having straight line generatrices.

6. In combination, a rotary sheave having one annular peripheral groove of relatively narrow width and small diameter disposed within another wider annular peripheral groove of larger diameter, and an endless elastic rubber belt of approximately circular cross-section adapted to be deformed within the inner portion of said wider groove and to be wedged into the space provided by said narrower groove, the inner portions of the side surfaces of said wider grooves being curved inwardly toward the outer opposite side portions of said narrow groove and the outer portions of said surfaces having straight line generatrices diverging from each other and spaced apart a distance greater than the belt diameter.

HUGO W. WEIMER.